United States Patent
Los et al.

(10) Patent No.: US 10,013,676 B2
(45) Date of Patent: Jul. 3, 2018

(54) FOR-YOUR-INFORMATION EVENTS

(71) Applicant: Microsoft Technology Licensing, LLC, Redmond, WA (US)

(72) Inventors: David J. Los, Bothell, WA (US); Neel Joshi, Bellevue, WA (US); Paul Tischhauser, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 274 days.

(21) Appl. No.: 15/002,261

(22) Filed: Jan. 20, 2016

(65) Prior Publication Data
US 2016/0140511 A1    May 19, 2016

Related U.S. Application Data

(63) Continuation of application No. 13/685,688, filed on Nov. 26, 2012, now Pat. No. 9,269,064.

(51) Int. Cl.
*G06F 3/048* (2013.01)
*G06Q 10/10* (2012.01)
*G06Q 10/06* (2012.01)

(52) U.S. Cl.
CPC ... *G06Q 10/1095* (2013.01); *G06Q 10/06314* (2013.01)

(58) Field of Classification Search
CPC .............. G06Q 10/1095; G06Q 10/06314
(Continued)

(56) References Cited

U.S. PATENT DOCUMENTS 6,016,478 A   1/2000   Zhang et al.
7,523,397 B2  4/2009   Cheung et al.
(Continued)

FOREIGN PATENT DOCUMENTS

CN     1992759 A     7/2007
CN     101228501 A   7/2008
(Continued)

OTHER PUBLICATIONS

"Outlook Resource Scheduling Options", Retrieved at«http://www.apps4rent.com/support/kb/article/outlook-resource-scheduling-option»Sep. 28, 2012, 2 Pages.
(Continued)

*Primary Examiner* — Anil N Kumar
(74) *Attorney, Agent, or Firm* — Jared S. Goff; Goff IP Law PLLC (57) ABSTRACT

A for-your-information event can be received in a computer system. The for-your-information event can include an event time field that indicates a scheduled time for the for-your-information event. The computer system may not automatically block the scheduled time of the for-your-information event on a calendar in response to receiving the for-your-information event. User input indicating that the for-your-information event is to be converted to a regular event can be received. In response to the user input, the computer system can convert the for-your-information event to a regular event. Converting the for-your information event can include automatically including the scheduled time of the for-your-information event as a scheduled time for the converted regular event. Also in response to the user input, the computer system can automatically block the scheduled time of the for-your-information event on the calendar.

20 Claims, 9 Drawing Sheets

(58) Field of Classification Search
USPC .......................................................... 715/764
See application file for complete search history.

(56) References Cited

U.S. PATENT DOCUMENTS

| | | | |
|---|---|---|---|
| 8,069,417 | B2 | 11/2011 | Brush et al. |
| 8,370,763 | B1 | 2/2013 | Moore et al. |
| 2003/0233265 | A1 | 12/2003 | Lee et al. |
| 2007/0130223 | A1 | 6/2007 | Savilampi et al. |
| 2008/0082925 | A1 | 4/2008 | Brush et al. |
| 2008/0133515 | A1 | 6/2008 | Chien et al. |
| 2009/0281843 | A1 | 11/2009 | Coffman et al. |
| 2010/0274619 | A1 | 10/2010 | Maresh et al. |

FOREIGN PATENT DOCUMENTS

| | | |
|---|---|---|
| CN | 101305340 A | 11/2008 |
| CN | 101742211 A | 6/2010 |

OTHER PUBLICATIONS

"Final Rejection Received for U.S. Appl. No. 13/685,688", dated Jan. 23, 2015, 16 Pages.

"Non-Final Rejection Received in U.S. Appl. No. 13/685,688", dated Oct. 3, 2014, 15 Pages.

"Notice of Allowance Received in U.S. Appl. No. 13/685,688", dated Oct. 29, 2015, 19 Pages.

"International Preliminary Report on Patentability Issued in PCT Application No. PCT/US2013/071875", dated Jun. 4, 2015, 7 Pages.

"International Search Report & Written Opinion Received for PCT Application No. PCT/US2013/071875", dated Jul. 11, 2014, 8 Pages.

"First Office Action and Search Report Issued in Chinese Patent Application No. 201380061619.7", dated Mar. 24, 2017, 15 Pages.

"Second Office Action Issued in Chinese Patent Application No. 201380061619.7", dated Dec. 4, 2017, 6 Pages.

"Office Action Issued in European Patent Application No. 13805685.8", dated Feb. 26, 2018, 7 Pages.

| | DAY WEEK MONTH NEW EVENT SHARE | | | | | | MIKE |
|---|---|---|---|---|---|---|---|
| ◀ MARCH 2011 ▶<br>27 28 1 2 3 4 5<br>6 7 8 9 10 11 12<br>13 14 15 16 17 18 19<br>20 21 22 23 24 25 26<br>27 28 29 30 31 1 2 | MARCH 2011 ◀ ▶ | | | | | | TODAY: WED, MARCH 22ND |
| | MON | TUE | WED | THU | FRI | SAT SUN | APPOINTMENTS – WORK<br>2PM: 1:1 W/JOE |
| | FEB 27 | 28 | MAR 1 | 2 | 3 | 4    5 | OTHER EVENTS<br>11AM: KIDS SCHOOL LATE START<br>5PM: PTA MEETING<br>7PM: JOHN WORKING LATE |
| CALENDARS<br>☑ MY CALENDAR<br>□ TEAM<br>   □ SALES TEAM | 6 | 7 | 8 | 9 | 10 | 11    12 | |
| | 13 | 14 | 15 | 16 | 17 | 18    19 | LOOK FORWARD |
| MAIL | 20 | 21 | 22<br>1:1 W/... | 23 | 24 | 25    26 | WORK CALENDAR<br>3/29: TIMECARD DUE<br>3/30: 1:1 W/JOE<br>FAMILY CALENDAR<br>3/24: LIBRARY BOOKS DUE<br>3/25: BOOK HOTEL FOR VACAT |
| CALENDAR | 27 | 28 | 29<br>TIME... | 30<br>1:1 W/... | 31 | APR 1   2 | SALES TEAM<br>3/31: SALES PROJECTIONS DUE<br>4/22: FULL SPECS DUE - IMPORT |
| CONTACTS | | | | | | | |
| TASKS | | | | | | | |

USER INTERFACE DISPLAY 500

MAIN CALENDAR REGION 510

REGULAR EVENT REPRESENTATIONS 512

FYI REGION 520

FYI REPRESENTATION 530

FOR-YOUR-INFORMATION EVENTS

RELATED APPLICATIONS

The present application is a continuation of U.S. application Ser. No. 13/685,688, filed Nov. 26, 2012, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

In current calendaring systems, digital calendar events can be sent to inform others about occurrences. For example, if a user is to schedule a business team meeting on Friday from 1:00 PM to 2:00 PM, the user can provide user input to generate and send an event in the form of a meeting invite from that user's user profile to user profiles for other users who are members of the business team. When the other users' calendar applications in their computer systems receive the meeting invite, those other calendar applications automatically block the Friday 1:00 PM to 2:00 PM time on calendars for the other team members' user profiles. As used herein, blocking a scheduled time for an event on a calendar refers to assigning the event to the scheduled time in a calendar data structure, so that when a representation of a time period for the calendar that includes the scheduled time is displayed, a representation of the event appears for the scheduled time. Additionally, a representation of the meeting invite can be displayed for each of the other users, and the representation can include user interface controls for providing user input on how to deal with the meeting invite (a button for accepting the meeting invite, a button for declining the meeting invite, a button for tentatively accepting the meeting invite, etc.).

SUMMARY

The description below relates to for-your-information events and regular events. As used herein, events are data structures whose data includes a representation of a scheduled time for the event. A for-your-information event is an event that defines a scheduled time. However, the scheduled time for a for-your-information event is not automatically blocked in a main calendar (such as a main calendar of a user profile receiving the event) upon receiving the event. A regular event, as used herein, is an event that defines a scheduled time and for which the scheduled time is automatically blocked in the main calendar upon receiving the event. For-your-information events may be represented in a secondary display region but not in a main calendar region, while the main calendar including regular events may be represented in the main calendar region. Also, the main calendar may be shared, including sharing of at least some level of detail regarding the regular events, without for-your-information events being shared.

In one embodiment, the tools and techniques can include receiving a for-your-information event in a computer system. The for-your-information event can include an event time field that indicates a scheduled time for the for-your-information event. The computer system may not automatically block the scheduled time of the for-your-information event on a calendar in response to receiving the for-your-information event. A regular event can also be received in the computer system. The received regular event can include a time field that indicates a scheduled time for the received regular event. The computer system can automatically block the scheduled time for the received regular event on the calendar in response to receiving the received regular event. A representation of the for-your-information event can be displayed. The representation can include a user interface control that can be selected by user input to convert the for-your-information event to a converted regular event and to block the scheduled time of the for-your-information event on the calendar for the converted regular event.

In another embodiment of the tools and techniques, a for-your-information event can be received in a computer system. The for-your-information event can include an event time field that indicates a scheduled time for the for-your-information event. The computer system may not automatically block the scheduled time of the for-your-information event on a calendar in response to receiving the for-your-information event. User input indicating that the for-your-information event is to be converted to a regular event can be received. In response to the user input, the computer system can convert the for-your-information event to a regular event. Converting the for-your information event can include automatically including the scheduled time of the for-your-information event as a scheduled time for the converted regular event. Also in response to the user input, the computer system can automatically block the scheduled time of the for-your-information event on the calendar.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to improved techniques and tools for sharing and handling of shared events. Such improvements may result from the use of various techniques and tools separately or in combination.

There is currently not a convenient way to send an event to a recipient without blocking time on the recipient's calendar, but to allow the event to later be converted to an event with blocked time on the calendar. The techniques and tools discussed herein relate to for-your-information events that can be sent and received without automatically blocking the scheduled time for the event on a recipient's calendar. However, after the for-your-information event is received, user input may be provided to convert the for-your-information event to a regular event and block the scheduled time of the for-your-information event on the recipient's calendar. Such for-your-information events may be beneficial in providing recipients information on some types of occurrences, such as occurrences where the corresponding user's attendance may be optional (e.g., an informational meeting or speaker series) or where a set time need not be scheduled (e.g., deadlines). However, if the recipient user decides to schedule the time, the user may do so. For example, a for-your-information event on an optional informational meeting may be converted to a regular event to block the scheduled time for the meeting on the user's calendar after the user decides to attend the meeting and provides user input to prompt the conversion.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
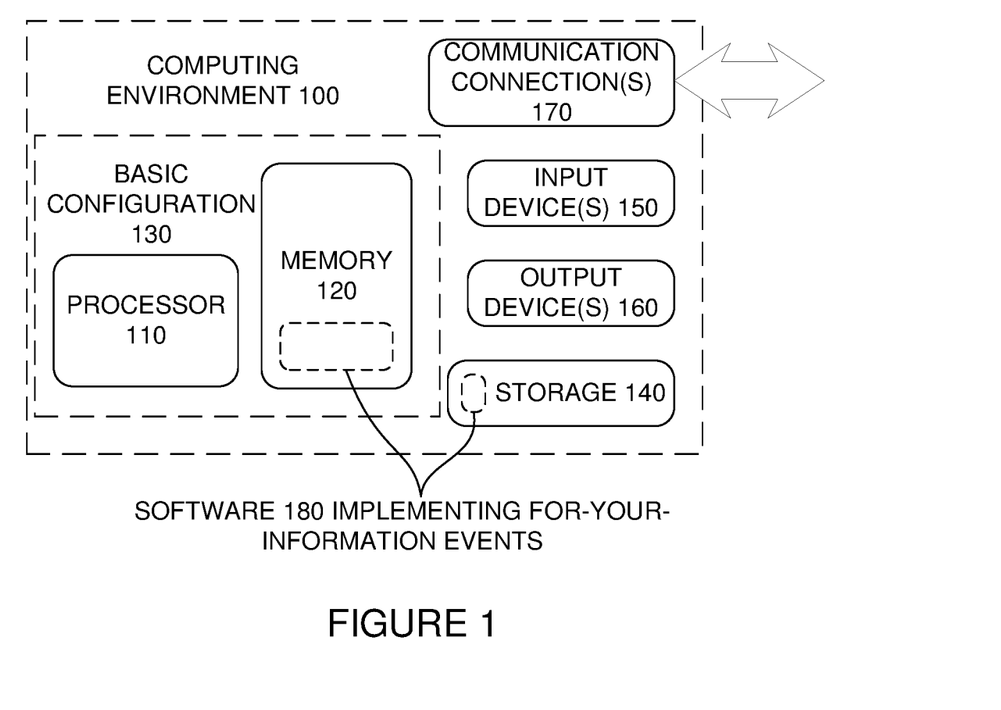
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as an event sending computing environment, an event server computing environment, and/or an event receiving computing environment. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing for-your-information events. An implementation of for-your-information events may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "receive," "send," "block," "display," "convert," "share," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. For-Your-Information Event System and Environment

Figure 2:
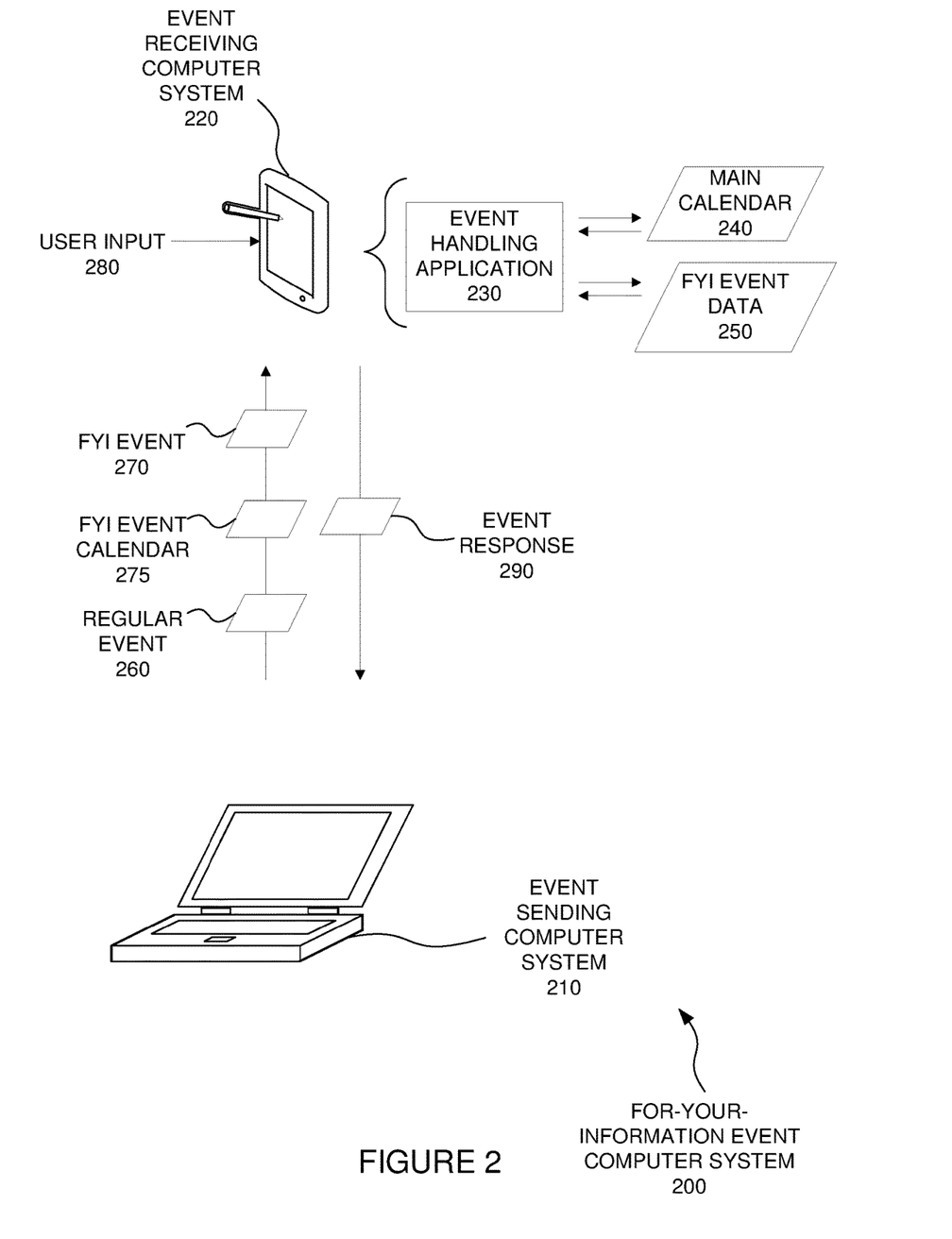
FIG. 2 is a schematic diagram of a for-your-information event environment or system.

FIG. 2 is a schematic diagram of a for-your-information event environment or system (200) in conjunction with which one or more of the described embodiments may be implemented. The system (200) can include an event sending computer system (210) and an event receiving computer system (220). The event sending computer system (210) and the event receiving computer system (220) can be different computer systems, but those computer systems (210 and 220) may each interact with other computing machines and/or computer networks between the event sending computer system (210) and the event receiving computer system (220) (e.g., local area networks, wide area networks, global computer networks, etc.). The event receiving computer system (220) can include an event handling application (230), which can access a main calendar (240) and for-your-information event data (250).

The main calendar (240) can be data for a calendar, such as a calendar for a single user profile or group of user profiles. The event handling application (230) may also access one or more other calendars (not shown), such as one or more other calendars for a single user profile. The main calendar (240) may incorporate events from one or more sub-calendars (e.g., a work calendar for a user profile, a personal calendar for the user profile, etc.). The event handling application can also access for-your-information event data (250). The for-your-information event data (250) may include data structures for for-your-information events. The main calendar (240) and the for-your-information event data (250) may be included in a single data structure, or in separate data structures. For example, events in the main calendar (240) may be distinguished by for-your-information events by a flag in each event record, or they may be distinguished by being included in separate collections. Also, the main calendar (240) and the for-your-information event data (250) may be included in a data structure that includes other information, such as e-mail records.

The event sending computer system (210) can generate and send regular events (260), such as regular meeting invitations, to the event receiving computer system. The event sending computer system (210) may also send for-your-information events (270) to the event receiving computer system (220). The event sending computer system (210) may send multiple for-your-information events (270) as part of a for-your-information calendar (275) that may be provided in any of various ways, such as by downloading the for-your-information calendar (275) from a web server (which can be the event sending computer system (210) in that situation). The for-your-information events (270), for-your information calendars (275) and/or regular events (260) may be sent in one or more of various different types of computing communications, such as email messages, network messages, intra-application function calls, application programming interface calls, etc.

The event handling application (230) in the event receiving computer system (220) can receive for-your-information events (270), for-your-information calendars (275), and/or regular events (260), and can process those received items and incorporate them into the main calendar (240) and the for-your-information event data (250). For example, the event handling application (230) can receive a for-your-information event (270) and can include the for-your-information event (270) in the for-your-information event data (250) without blocking time on the main calendar (240). However, the event handling application (230) may display a representation of the received for-your-information event outside a display region for the main calendar (240) (e.g., in a secondary display region that is different from the display region for the main calendar). Additionally, the event handling application (230) may respond to user input (280) by converting the for-your-information event (270) to a regular event (260) and automatically blocking a scheduled time from the for-your-information event (270) on the main calendar (240).

The event handling application (230) can also receive regular events (260) and automatically block scheduled times for those regular events (260) on the main calendar (240). For example, the time may be blocked as busy, out of the office, tentative, free, etc.

Upon receiving a for-your-information event calendar (275), the event handling application (230) can include the for-your-information events (270) in the for-your-information event calendar (275) in the for-your-information event data (250), and representations of the for-your-information event data (250) may be displayed along with other for-your-information events (270). The for-your-information event calendar (275) may be displayed separately from other for-your-information event data (250) outside the main calendar (240), such as in a separate secondary calendar. Also, the for-your-information events (270) in the for-your-information event data (250) may each be converted to regular events (260) in response to user input (280) requesting such conversion.

The event receiving computer system (220) can send one or more event responses (290) to the regular events (260) and/or the for-your-information events (270). For example, such responses (290) may be sent in response to user input specifying treatment of received for-your-information events (270) and/or regular events (260). For example, the user input may specify that a regular event (260) is to be accepted, declined, or tentatively accepted, and the event response (290) may indicate this action to the event sending computer system (210). Similarly, for for-your-information events (270), the event response (290) may indicate that the for-your-information event (270) has been successfully received, has been ignored, and/or has been converted to a regular event (260).

While an example of the for-your-information event computer system (200) has been discussed above, various changes may be made to the system (200). For example, the for-your-information events (270), regular events (260), and/or for-your-information event calendars (275) may be received at the event receiving computer system (220) when the event (260 or 270) or calendar (275) was sent from a different user profile on the computer system. Also, while one event sending computer system (210) and one event receiving computer system (220) are shown, the event sending computer system (210) may also act as an event receiving computer system, the event receiving computer system (220) may also act as an event sending computer system, and the for-your information event computer system (200) may include many sending and receiving computer systems (210 and 220). Accordingly, the event sending computer system (210) can include an event handling application, main calendar, for-your-information event data, etc. As another example, while a single event handling application (230) is shown as handling for-your-information events (270) and regular events (260), the event receiving computer system (220) could include one application for handling regular events (260) and another application for handling for-your-information events (270). In such an implementation, conversion of for-your-information events (270) to regular events (260) could involve communications (e.g., application programming interface calls) between the applications.

III. Examples of for-Your-Information Event Displays

Examples of for-your-information event displays will now be discussed. Such displays may be displayed in the event sending computer system (210), the event receiving computer system (220) and/or some other computing system that is connected to the event sending computer system (210) and/or event receiving computer system (220). Each of the displays can be presented by an application, such as a calendaring application. Such an application may also handle other information such as e-mails that are not calendar items (though some calendar events may be sent as email messages) and related information such as contacts, tasks, etc. The displays can be surfaced as user interfaces on a computer display, and the user interfaces may be represented in any of various ways, such as with user interface elements, data structures including multiple user interface elements (e.g., trees of user interface elements), etc. Such data structures can be used by rendering engines to render the user interface displays. User input directed to controls in the user interface displays can be recognized and responded to by invoking appropriate modules within the computer system to perform the techniques discussed herein.

Figure 3:
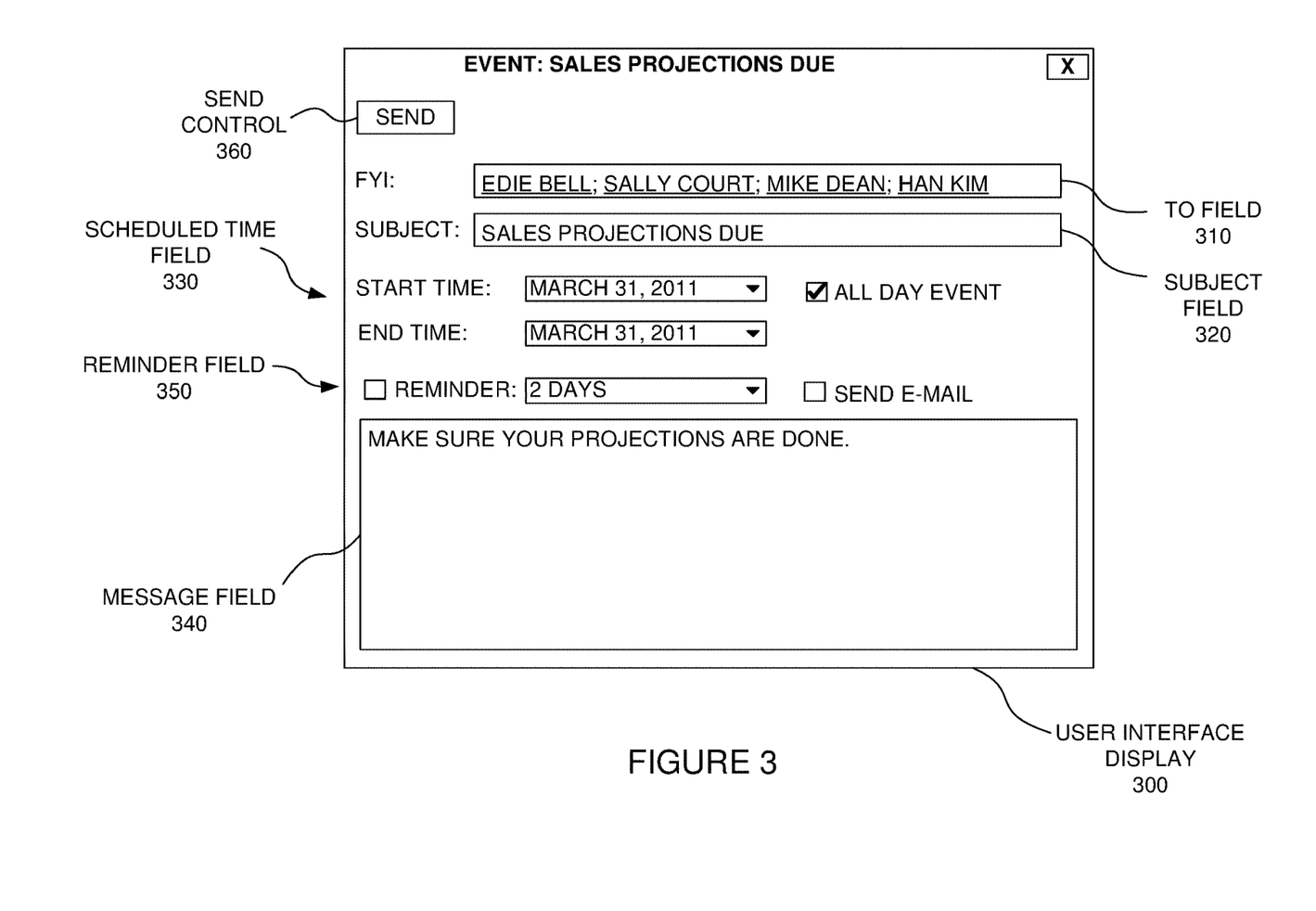
FIG. 3 is a diagram of a user interface display that can be displayed to receive user input to fill in fields for a for-your-information event.

Referring now to FIG. 3, a user interface display (300) for receiving user input for a for-your-information event is illustrated. For example, the user interface display (300) may be displayed and user input may be provided to fill in fields of the user interface display (300) at the event sending computer system (210) discussed above with reference to FIG. 2. For example, the user interface display (300) may be a dialog that is raised in the context of a sales team calendar. For example, a user profile such as a profile with a name label of JOE ALLEN may have been logged into the sales team calendar when generating and filling in the user interface display (300).

The user interface display (300) can include a TO field (310), which can list labels (names, email addresses, other aliases, etc.) for the user profiles to which the for-your-information (FYI) event is to be sent. In the example of FIG. 3, the TO field (310) lists EDIE BELL, SALLY COURT, MIKE DEAN, and HAN KIM as recipients. The user interface display (300) can also include a SUBJECT field (320), which can list a subject for the for-your-information event.

Additionally, the user interface display (300) can include a scheduled time field (330), which can list a scheduled time for the for-your-information event. The scheduled time may be a specific time including a time of day, a range of times including times of day, a date, a range of dates, etc. In the example, the scheduled time field (330) includes a START TIME entry box and an END TIME entry box. Additionally, a check box for an ALL DAY EVENT is checked so that the for-your-information event will have a scheduled time that extends for one or more entire days. Accordingly, in the example, the start time and end time each list a date, without a time of day. The user interface display (300) can also include a message field (340), which can include a message to be included in the for-your-information event (270) resulting from the user interface display (300).

The user interface display (300) can also include a reminder field (350), which can indicate whether a reminder is to be provided to the recipients of the for-your-information event. For example, a checkbox to the left of the word "REMINDER" can indicate that a reminder is to be provided if the checkbox is checked (which it is not in the example provided). The reminder may be provided in any of various ways, such as surfacing a user interface display, making a sound, etc. Additionally, the reminder field (350) can list an amount of time before the scheduled time for the reminder to be provided (the reminder time). Also, a "SEND EMAIL" checkbox can be checked to indicate that an e-mail is to be sent to the recipient at the reminder time to remind the recipient of the for-your-information event. The fields (310, 320, 330, 340, and 350) can be filled in response to user input, and may also be edited in response to user input.

Additionally, the user interface display (300) can include a send control (360), which can be selected by user input to initiate sending of the for-your-information event (270) resulting from the user interface display (300). For example, referring to FIGS. 2-3, the event sending computer system (210) can respond to the user input selecting the send control (360) by sending the information in the fields (310, 320, 330, 340, and 350) of FIG. 3 in a for-your-information event (270) from the event sending computer system (210) to the event receiving computer system (220).

Figure 4:
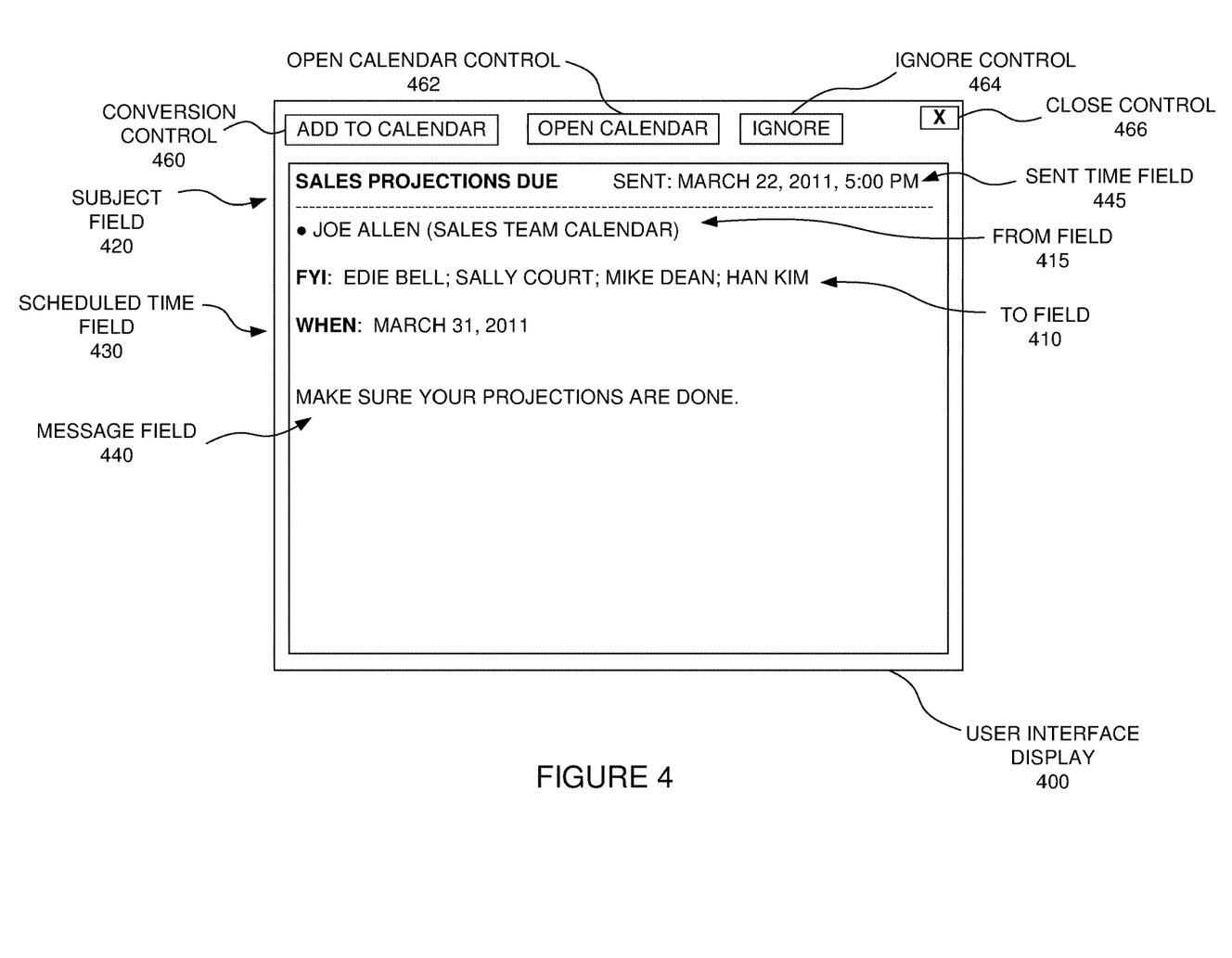
FIG. 4 is a diagram of a user interface display that can be displayed as a representation of a for-your-information event.

Referring now to FIGS. 2 and 4, the for-your-information event (270) resulting from the information in the fields (310, 320, 330, 340, and 350) of FIG. 3 can be received at the event receiving computer system (220). A representation of the for-your-information event (270) can be displayed, such as in the form illustrated as a user interface display (400) in FIG. 4. The user interface display (400) may be displayed automatically upon receipt of the for-your-information event (270), or the user interface display (400) may be displayed after additional user input (e.g., user input selecting a less-detailed representation of the for-your-information event (270)). The user interface display (400) can include a TO field (410) including information from the TO field (310) from FIG. 3, and a from field (415) listing the label for the user profile and possibly the calendar from which the for-your-information event (270) came. Additionally, the user interface display (400) can include a subject field (420), scheduled time field (430), and a message field (440), each including the information from the corresponding field (320, 330, or 340) of the user interface display (300) of FIG. 3. The user interface display (400) may also include a sent time field (445) listing a time when the for-your-information event (270) was sent.

In addition to the informational fields (410, 415, 420, 430, 440, and 445), the user interface display (400) may include controls, which can be selected to provide user input instructing the event receiving computer system (220) on how to handle the received for-your-information event (270). For example, the controls can include a conversion control (460), which can be selected to have the event receiving computer system (220) convert the for-your-information event (270) to a regular event and block the scheduled time from the scheduled time field (430) on a calendar for a user profile that is active at the event receiving computer system (220) (such as EDIE BELL, SALLY COURT, MIKE DEAN, or HAN KIM). For example, this conversion may be performed by the event receiving computer system (220) revising a flag in the for-your-information event (270) or moving the event from a for-your-information event collection to a regular event collection. The event receiving computer system (220) may also prompt for additional user input before or after converting the for-your-information event (270), such as additional user input indicating one of multiple available time blocking categories for the converted event (e.g., as busy, out of the office, tentative, free, etc.). Alternatively, such a blocking category may be automatically selected, such as using a default blocking category, or the system may not use blocking categories.

The controls of the user interface display (400) may also include an open calendar control (462) that can be selected to prompt the event receiving computer system (220) to open and display a calendar for an active user profile on the event receiving computer system (e.g., by making a function or application programming interface call). The user interface display (400) may also include an ignore control (464), which can be selected to ignore the corresponding for-your-information event (270), so that the for-your-information event (270) is not included in the for-your-information event data (250) and is not displayed with other for-your-information events (270). The user interface display (400) can also include a close control (466), which can be selected by user input to close the user interface display (400) and leave the corresponding for-your-information event (270) in the for-your-information event data (250).

Figure 5:
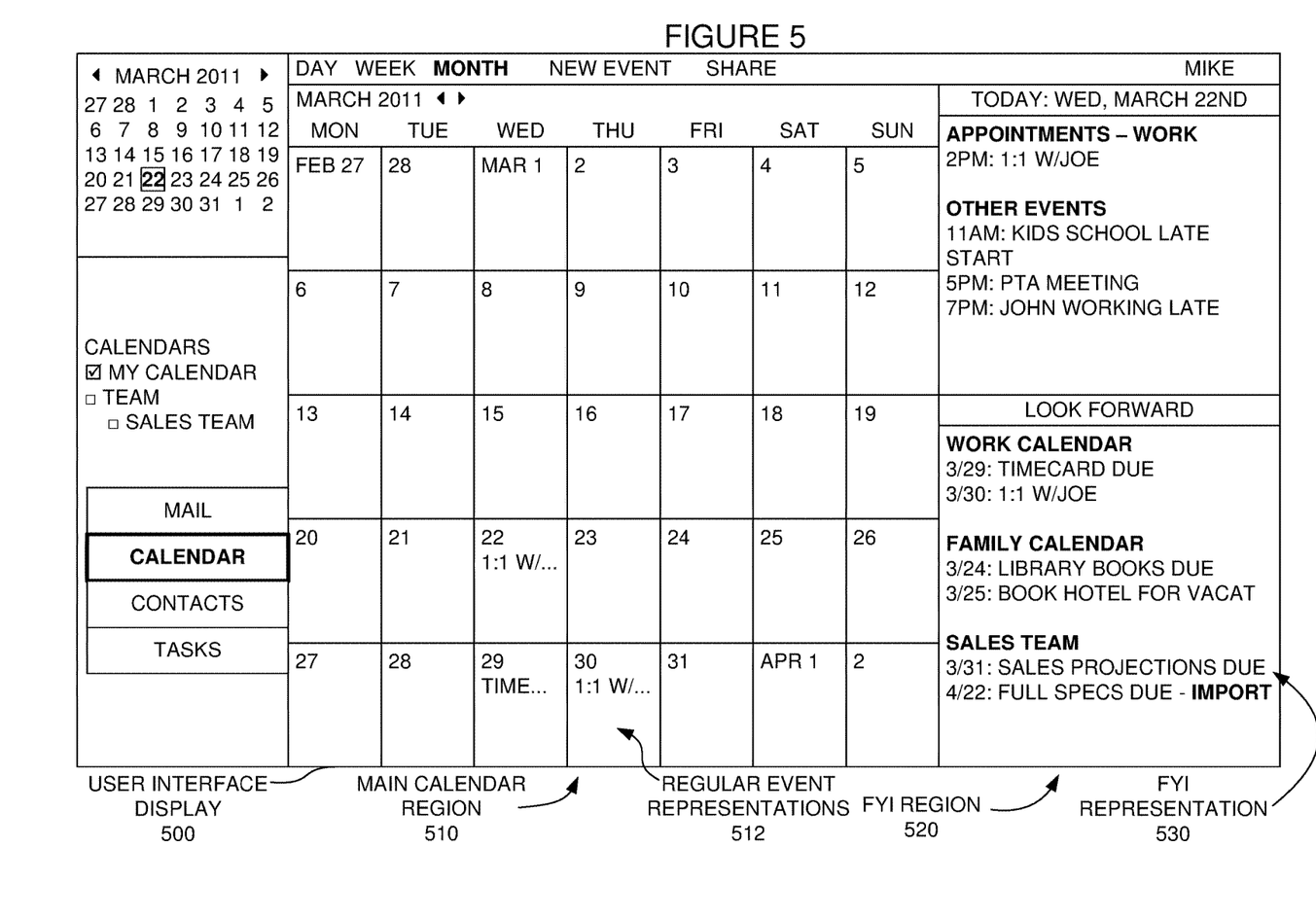
FIG. 5 is a diagram of a user interface display including a main calendar region and a for-your-information region.

Referring to FIGS. 2 and 5, a user interface display (500) is illustrated, providing an example of a user interface display of a calendar application. The user interface (500) can include a view of a main calendar and for-your-information event representations, with the for-your-information event (270) represented by the user interface display (400) of FIG. 4 having been left as a for-your-information event (270) in the for-your-information event data (250). The user interface display (500) can include a main calendar region (510), which can display representations (512) of regular events in a main calendar being displayed (in month view in the example, although other views such as day views, week views, etc. may also be used), such as a main calendar for an active user profile (for the user profile having the label "MIKE" in the example of FIG. 5 and in FIG. 6 discussed below). As can be seen, the main calendar region (510) in the example displays representations (512) of regular events blocking time on March 22nd, March 29th, and March 30th.

The user interface display (500) can also include a for-your-information region (520). The for-your-information region (520) can include representations of for-your-information events (270), and the for-your-information region (520) may additionally include other information such as representations of regular events that are also represented in the main calendar region (510). For example, the user interface display (500) of FIG. 5 is for a current day of Mar. 22, 2011. In the "TODAY" area of the for-your-information region (520), regular calendar events for the current day can be represented under the heading "APPOINTMENTS", while for-your-information events on the current day may be listed under the heading "OTHER EVENTS". Additionally, the "LOOK FORWARD" area of the for-your-information region (520) can include for-your-information events and regular calendar events beyond the current day (e.g., for a month beyond the current day, or some other amount of time beyond the current day).

As can be seen in this example, the for-your-information region (520) includes a for-your-information representation (530) of the for-your-information event (270) that was also represented by the user interface display (400) discussed above with reference to FIG. 4. This for-your-information representation (530) is included in the "LOOK FORWARD" area of the for-your-information region (520). However, time on the main calendar in the main calendar region (510) is not blocked for the for-your-information representation (530), as can be seen in the empty March 31 calendar block in the main calendar region (510). The for-your-information representation (530) can be an interactive control that can be selected to bring up additional information and/or controls related to the for-your-information event (270) represented by the for-your-information representation (530). For example, selecting the for-your-information representation (530) could result in the event receiving computer system (220) displaying a drop-down menu with options, such as the options provided by the controls (460, 462, and 464) discussed above with reference to FIG. 4. As another example, selecting the for-your-information representation (530) could result in the event receiving computer system (220) displaying the user interface display (400) discussed above with reference to FIG. 4.

Figure 6:
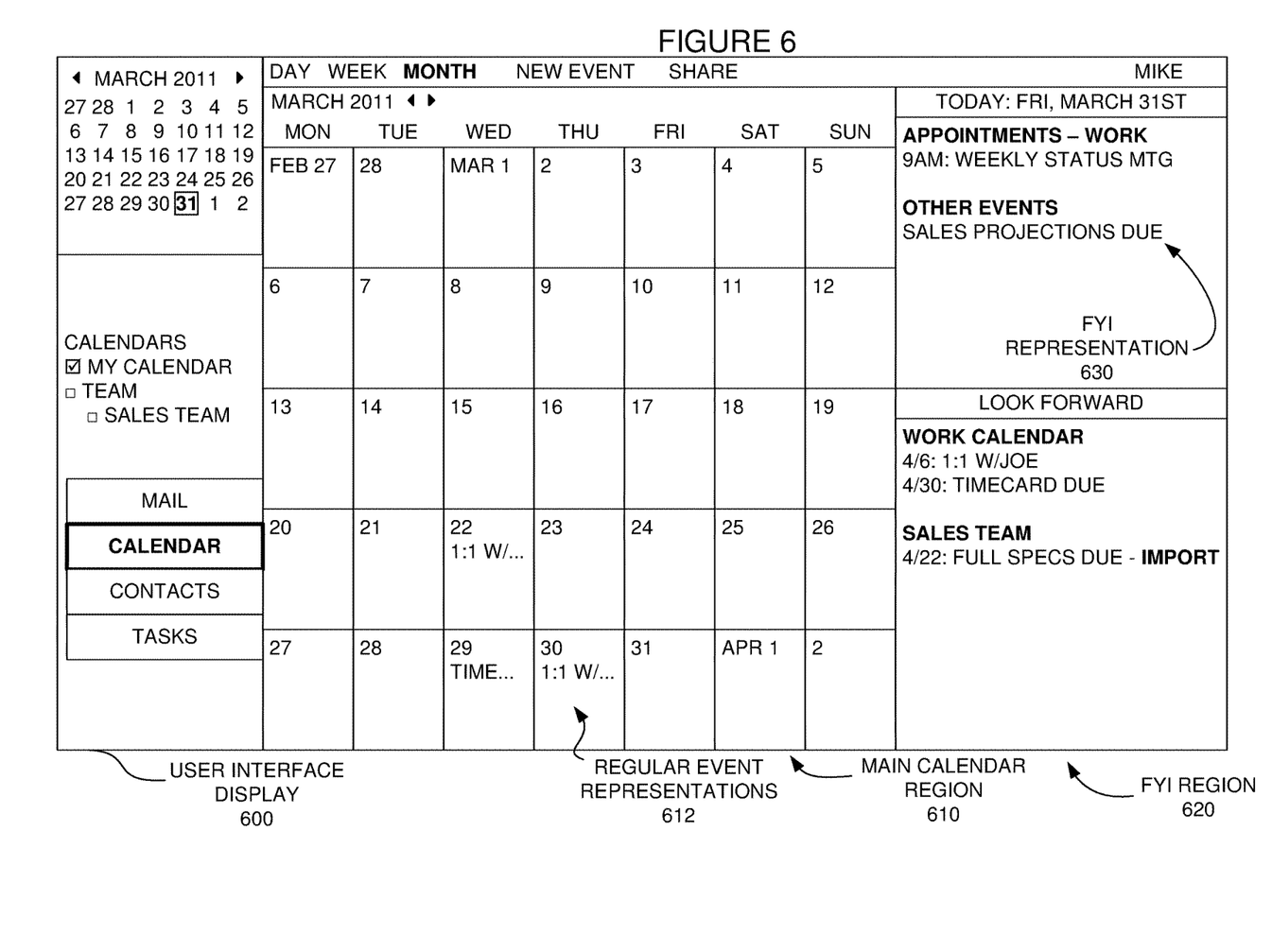
FIG. 6 is a diagram of a user interface display similar to the user interface display of FIG. 5, but on a different date.

Referring now to FIGS. 2 and 6, a user interface display (600) is similar to the user interface display (500) discussed above with reference to FIG. 5, with a main calendar region (610) including regular event representations (612), and with a for-your-information region (620). However, in the user interface display (600), the date has moved forward to March 31, the date of the for-your-information event (270) discussed above with reference to FIGS. 3-4. Accordingly, the for-your-information representation (630) that represents the for-your-information event (270) represented by the user interface displays of FIGS. 3-4 above is located in the "TODAY" area of the for-your-information region (620), rather than the "LOOK FORWARD" area of the for-your-information region (620), as was the case with the for-your-information representation (530) in the user interface display (500) of FIG. 5.

IV. For-Your-Information Event Techniques

Several for-your-information event techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique. The techniques discussed below may be performed at least in part by hardware logic.

Figure 7:
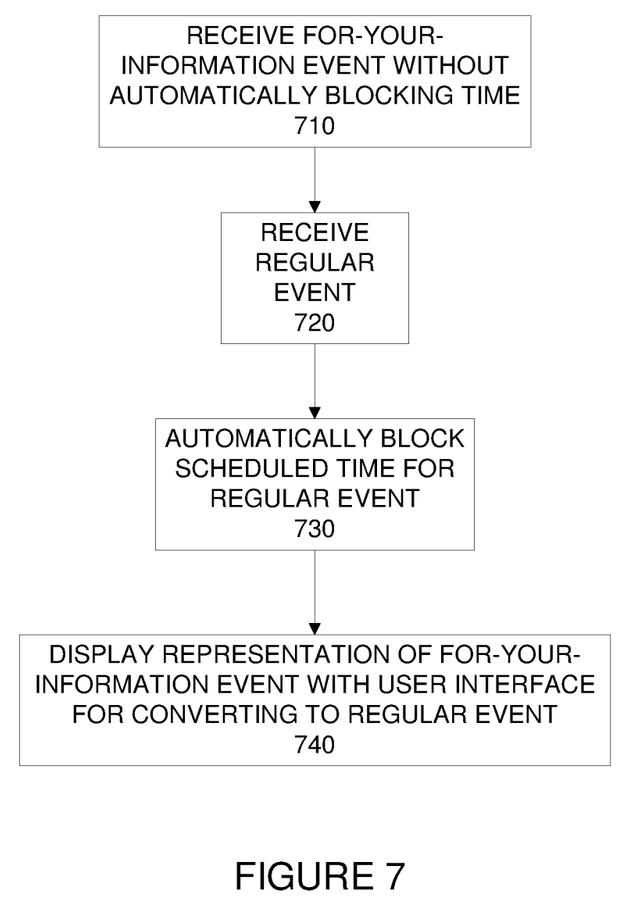
FIG. 7 is a flowchart of a for-your-information event technique.

Referring to FIG. 7, a for-your-information event technique will be discussed. The technique can include receiving (710) a for-your-information event in a computer system. The for-your-information event can include an event time field that indicates a scheduled time for the for-your-information event. The computer system may not automatically block the scheduled time of the for-your-information event on a calendar in response to receiving the for-your-information event. The technique can include receiving (720) a regular event in the computer system. The received regular event can include a time field that indicates a scheduled time for the received regular event. Additionally, the technique can include the computer system automatically blocking (730) the scheduled time for the received regular event on the calendar in response to receiving the received regular event. The technique can also include displaying (740) a representation of the for-your-information event. The representation can include a user interface control that can be selected by user input to convert the for-your-information event to a converted regular event and to block the scheduled time of the for-your-information event on the calendar for the converted regular event.

The technique may also include the computer system receiving an additional event. The additional event can include a time field that indicates a time for the additional event. The computer system can determine whether the additional event is a regular event or a for-your-information event. If the computer system determines that the additional event is a regular event, then the computer system can automatically block time on the calendar for the additional event. If the computer system determines that the additional event is a for-your-information event, then the computer system may not automatically block time on the calendar for the additional event.

The technique of FIG. 7 may further include sharing the calendar. Sharing can include sharing the received regular event, and sharing may not include sharing the for-your-information event. User input, which indicates the for-your-information event is to be converted to a regular event, can be received. In response to the user input, the computer system can convert the for-your-information event to a regular event and can block time on the calendar for the converted regular event. For example, the user input may include user input selecting the user interface control that is included in the displayed representation of the for-your-information event.

The technique can further include displaying a representation of the received regular event in a main calendar display region and displaying a representation of the for-your-information event in a secondary display region. The main calendar display region can include a plurality of representations of regular events and the secondary display region can include a plurality of representations of for-your-information events. The main calendar display region and the secondary display region can be displayed at the same time.

The for-your-information event can include a reminder setting, and the reminder setting can be set to provide a reminder of the for-your-information event. The computer system can provide a reminder of the for-your-information event in response to the reminder setting.

Receiving (710) the for-your-information event in the computer system can be part of receiving a calendar of for-your-information events. The calendar of for-your-information events can include the for-your-information event, and the calendar can be designated as a for-your-information calendar in the computer system.

Figure 8:
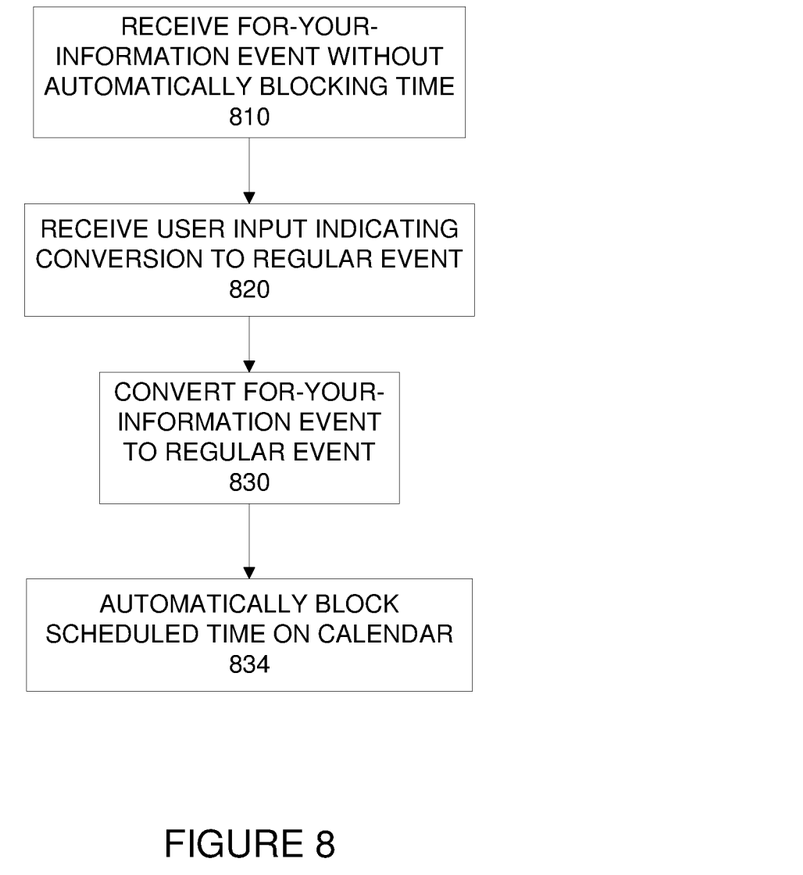
FIG. 8 is a flowchart of another for-your-information event technique.

Referring now to FIG. 8, another for-your-information event technique will be discussed. The technique can include receiving (810) a for-your-information event in the computer system. The for-your-information event can include an event time field that indicates a scheduled time for the for-your-information event. The computer system may not automatically block the scheduled time for the for-your-information event on a calendar in response to receiving the for-your-information event. Additionally, the technique of FIG. 8 may include receiving (820) user input (such as a single user input action) indicating that the for-your-information event is to be converted to a regular event. In response to the user input, the computer system can convert (830) the for-your-information event to a regular event. Converting (830) can include automatically including the scheduled time of the for-your-information event as a scheduled time for the converted regular event. Also in response to the user input, the computer system can automatically block (834) the scheduled time of the for-your-information event on the calendar.

The technique of FIG. 8 can additionally include the computer system displaying a representation of the for-your-information event prior to receiving the user input. The representation can include a control for converting the for-your-information event to a regular event, and the user input can select the control.

The technique of FIG. 8 may also include displaying a representation of the for-your-information event in a first display region, but not in a second display region prior to converting the for-your-information event to the converted regular event. The technique may include displaying the converted regular event in the second display region after receiving the user input. The first display region and the second display region can both be display regions of a user interface for the computer system, such as regions of a user interface for a calendar application in the computer system.

The technique may further include receiving an additional regular event in the computer system. The additional regular event can include a time field having a scheduled time. In response to receiving the additional regular event, the technique can include automatically blocking the scheduled time of the additional regular event on the calendar.

Figure 9:
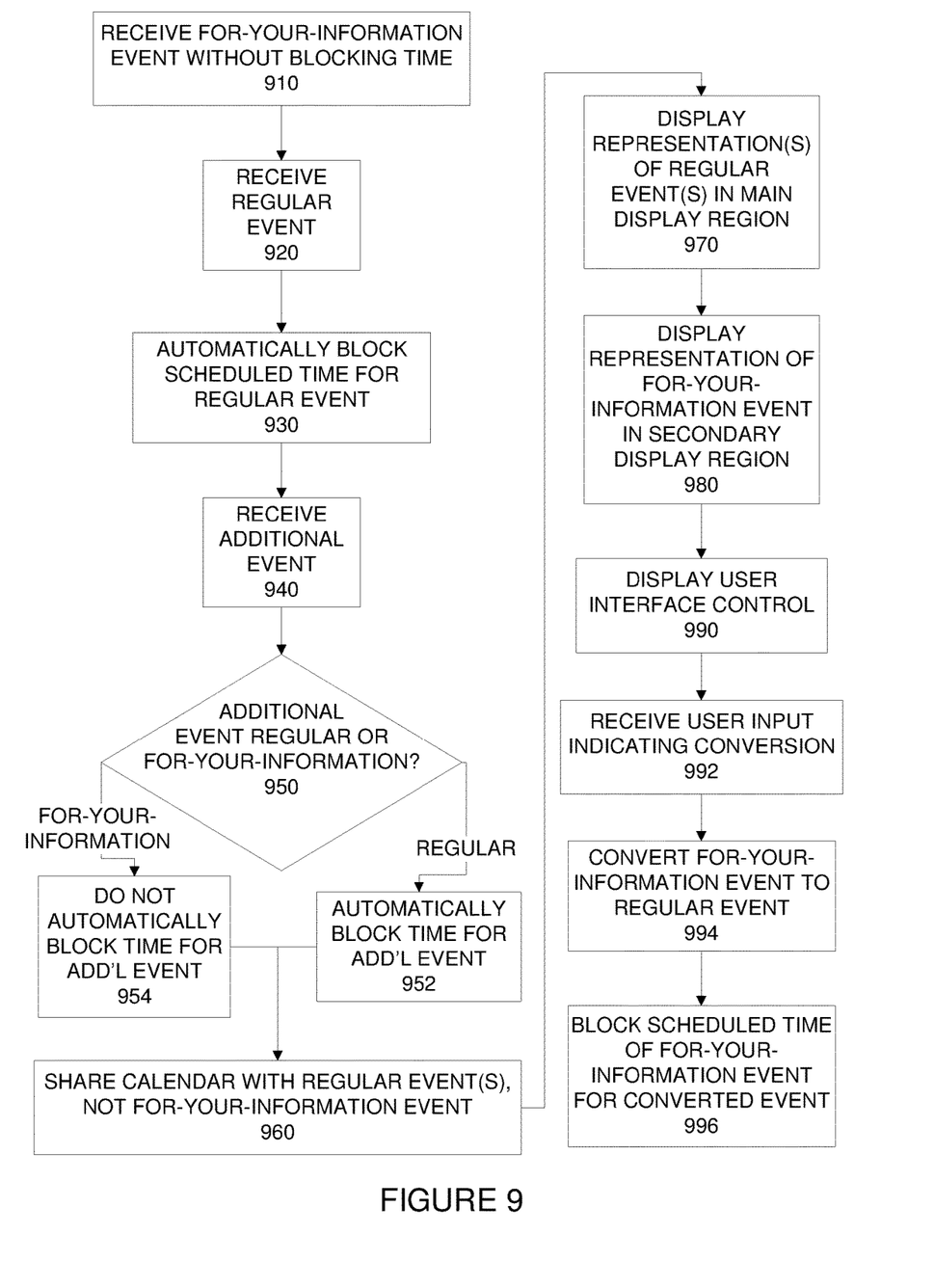
FIG. 9 is a flowchart of yet another for-your-information event technique.

Referring now to FIG. 9, yet another for-your-information event technique will be discussed. The technique can include receiving (910) a for-your-information event in a computer system. The for-your-information event can include an event time field that indicates a scheduled time for the for-your-information event. The computer system may not automatically block the scheduled time of the for-your-information event on a calendar in response to receiving the for-your-information event. Additionally, a regular event can be received (920) in the computer system. The regular event can include a time field that indicates a scheduled time for the regular event. The computer system can automatically block (930) the scheduled time for the regular event on the calendar in response to receiving the regular event.

The technique of FIG. 9 can further include the computer system receiving (940) an additional event including a time field that indicates a scheduled time for the additional event. The computer system can determine (950) whether the additional event is a regular event or a for-your-information event. If the computer system determines (950) that the additional event is a regular event, then the computer system can automatically block (952) a scheduled time for the additional event. If the computer system determines (950) that the additional event is a for-your-information event, the computer system may not automatically block (954) the scheduled time for the additional event.

The technique may also include sharing (960) the calendar. Sharing (960) the calendar can include sharing one or more regular events. Sharing (960) the calendar may not include sharing the for-your-information event.

The technique can further include displaying (970) one or more representations of the one or more regular events in a main calendar display region. A representation of the for-your-information event can be displayed (980) in a secondary display region at the same time as displaying the representations of the regular event in the main display region. A user interface control associated with the for-your-information event can be displayed (990). User input indicating that the for-your-information event is to be converted to a regular event can be received (992). The user input can select the user interface control. In response to the user input indicating that the for-your-information event is to be converted to a regular event, the computer system can convert (994) the for-your-information event to a regular event and block (996) the scheduled time of the for-your-information event on the calendar for the converted event.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system, comprising:
   at least one processor; and
   memory comprising instructions stored thereon that when executed by at least one processor cause at least one processor to perform acts comprising:
   receiving a plurality of for-your-information events in the computer system, the for-your-information events each including an event time field that indicates a scheduled time for the for-your-information event, the computer system refraining from automatically blocking the scheduled times of the for-your-information events on a main calendar in response to receiving the for-your-information events and recognizing that the for-your-information events are a for-your-information type of event, with the for-your-information type of event being a type of calendar event;
   receiving a regular event in the computer system, the received regular event including a time field that indicates a scheduled time for the received regular event;
   the computer system automatically blocking the scheduled time for the received regular event on the main calendar in response to receiving the received regular event and recognizing that the regular event is a regular type of event;
   displaying a representation of the received regular event in a main calendar display region for the main calendar, the main calendar display region comprising a plurality of representations of regular events;
   displaying representations of the for-your-information events in a secondary display region, the secondary display region comprising a plurality of representations of the for-your-information events, the main calendar display region and the secondary display region being displayed at the same time, while scheduled times for the for-your-information events are not blocked on the main calendar; and
   displaying a user interface control that is configured to be selected by user input to convert a selected for-your-information event to a converted regular event and to block a scheduled time of the selected for-your-information event on the main calendar for the converted regular event.

2. The computer system of claim 1, wherein the receiving of the for-your-information events in the computer system is part of receiving a calendar of for-your-information events as a calendar over a computer network, wherein the calendar of for-your-information events comprises the plurality of for-your-information events, and the calendar of for-your-information events is designated as a for-your-information calendar separate from the main calendar in the computer system.

3. The computer system of claim 1, wherein the acts further comprise:
receiving additional events in the computer system, the additional events each including a time field that indicates a time for the additional event;
for each of the additional events, determining, via the computer system, whether the additional event is a regular event or a for-your-information event, the determination comprising identifying one or more of the additional events as being one or more regular events and identifying one or more of the additional events as being one or more for-your-information events;
in response to the identifying of one or more of the additional events as being the one or more regular events, the computer system automatically blocking time on the main calendar for the one or more regular events; and
in response to the identifying of one or more of the additional events as being the one or more for-your-information events, the computer system refraining from automatically blocking time on the main calendar for the one or more for-your-information events.

4. The computer system of claim 1, wherein the acts further comprise sharing the main calendar, wherein sharing the main calendar comprises sharing the received regular event, and wherein sharing the main calendar does not comprise sharing the for-your-information events.

5. The computer system of claim 1, wherein the acts further comprise:
receiving user input indicating that the selected for-your-information event is to be converted to a regular event; and
in response to the user input indicating that the selected for-your-information event is to be converted to a regular event, the computer system converting the selected for-your-information event to a regular event and blocking time on the main calendar for the converted regular event, wherein the user input comprises user input selecting the user interface control for the selected for-your-information event.

6. The computer system of claim 1, wherein a specific for-your-information event of the for-your-information events comprises a reminder setting, the reminder setting being set to provide a reminder of the specific for-your-information event, and wherein the acts further comprise providing a reminder of the specific for-your-information event in response to the reminder setting while time is not blocked on the main calendar for the specific for-your-information event.

7. The computer system of claim 1, wherein the acts are performed at least in part by hardware logic.

8. A computer-implemented method comprising:
receiving a for-your-information event in a computer system for a receiving user profile, the for-your-information event further including an event time field that indicates a scheduled time for the for-your-information event, the computer system being configured to refrain from automatically blocking the scheduled time of the for-your-information event on a main calendar for the receiving user profile in response to receiving the for-your-information event and recognizing that the for-your-information event is a for-your-information type of event, with the for-your-information type of event being a type of calendar event;
displaying a main calendar display region for the main calendar, the main calendar display region comprising a plurality of representations of regular events;
displaying a representation of the for-your-information event along with one or more representations of one or more other for-your-information events in a secondary display region, the secondary display region comprising a plurality of representations of the for-your-information events, and the main calendar display region and the secondary display region being displayed at the same time, while scheduled times for the for-your-information event and the one or more other for-your-information events are not blocked on the main calendar;
receiving user input indicating that the for-your-information event is to be converted to a regular event; and
in response to the user input, the computer system converting the for-your-information event to a regular event, converting the for-your-information event comprising automatically including the scheduled time of the for-your-information event as a scheduled time for the converted regular event; and
in response to the user input, automatically blocking the scheduled time of the for-your-information event on the main calendar.

9. The method of claim 8, wherein the receiving of the for-your-information event comprises receiving the for-your-information event as an invite from a sending user profile, with the for-your-information event including an indication of the sending user profile and an indication of the receiving user profile.

10. The method of claim 8, wherein the user input is a single user input action.

11. The method of claim 8, wherein the method further comprises the computer system displaying a representation of the for-your-information event prior to receiving the user input, with the representation of the for-your-information event comprising a control for converting the for-your-information event to a regular event, and wherein the user input selects the control for converting the for-your-information event to a regular event.

12. The method of claim 8, wherein the method further comprises displaying a representation of the for-your-information event in a first display region but not in a second display region prior to converting the for-your-information event to the converted regular event, and displaying a representation of the converted regular event in the second display region after receiving the user input.

13. The method of claim 12, wherein the first display region and the second display region are both display regions of a user interface for the computer system.

14. The method of claim 8, wherein the method further comprises:
receiving an additional regular event in the computer system, the additional regular event including a time field having a scheduled time; and
in response to receiving the additional regular event, automatically blocking the scheduled time of the additional regular event on the main calendar.

15. The method of claim 8, wherein the for-your-information event comprises a reminder setting, the reminder setting being set to provide a reminder of the for-your-information event.

16. The method of claim 15, further comprising providing a reminder of the for-your-information event in response to the reminder setting while time is not blocked on the main calendar for the for-your-information event.

17. The method of claim 8, wherein the method further comprises sharing the main calendar before the converting of the for-your-information event to a regular event, wherein sharing the main calendar comprises sharing the regular events, and wherein sharing the main calendar does not comprise sharing the for-your-information event.

18. A computer system comprising:
at least one processor; and
memory comprising instructions stored thereon that when executed by at least one processor cause at least one processor to perform acts comprising:
receiving a for-your-information event in the computer system, the for-your-information event including an event time field that indicates a scheduled time for the for-your-information event, the computer system not automatically blocking the scheduled time of the for-your-information event on a main calendar in response to receiving the for-your-information event and recognizing that the for-your-information event is a for-your-information type of event, with the for-your-information type of event being a type of calendar event;
receiving a regular event in the computer system, the regular event including a time field that indicates a scheduled time for the regular event;
the computer system automatically blocking the scheduled time for the regular event on the main calendar in response to receiving the regular event;
displaying a representation of the received regular event in a main calendar display region for the main calendar, the main calendar display region comprising a plurality of representations of regular events;
displaying a representation of the for-your-information event in a secondary display region, the secondary display region comprising a plurality of representations of for-your-information events including the for-your-information event, and the main calendar display region and the secondary display region being displayed at the same time;
displaying a user interface control associated with the for-your-information event;
receiving user input indicating that the for-your-information event is to be converted to a regular event, the user input selecting the user interface control; and
in response to the user input indicating that the for-your-information event is to be converted to a regular event, the computer system converting the for-your-information event to a regular event and blocking the scheduled time of the for-your-information event on the main calendar for the converted regular event.

19. The computer system of claim 18, wherein the acts further comprise providing a reminder of the for-your-information event in response to a reminder setting for the for-your-information event while the for-your-information event is stored as a for-your-information event in the computer system and while the scheduled time for the for-your-information event is not blocked on the main calendar.

20. The computer system of claim 18, wherein the receiving of the for-your-information event comprising receiving the for-your-information event over a computer network for a receiving user profile, wherein the receiving the for-your-information event comprises receiving the for-your-information event as an invite from a sending user profile, and wherein the for-your-information event includes an indication of the sending user profile and an indication of the receiving user profile.

\* \* \* \* \*